Patented Mar. 7, 1944

2,343,834

UNITED STATES PATENT OFFICE 2,343,834

RUBBER HYDROCHLORIDE

Winfield Scott, Akron, Ohio, assignor to Wingfoot Corporation, Wilmington, Del., a corporation of Delaware No Drawing. Application March 29, 1939,
Serial No. 264,779

9 Claims. (Cl. 260—735)

This invention relates to the stabilization of rubber hydrohalides against deterioration by the addition thereto of a photochemical inhibitor. More particularly, it relates to the use of certain high-boiling photochemical inhibitors which are substantially permanent and nonblooming and are especially advantageous in plasticized rubber hydrohalides.

Rubber hydrohalides, such as rubber hydrochloride, have been known for many years and, in recent years, have become commercially useful. For some commercial uses of such materials, it is necessary to employ stabilizers in order to retard the deterioration of the material caused or accelerated by the action of sunlight or other sources of ultra-violet light. It is the purpose of the present invention to provide new and improved photochemical inhibitors for use in rubber hydrohalides. It is a further object of the invention to provide a new and improved rubber hydrohalide composition containing such photochemical inhibitors. Other objects and advantages will appear as the description of the invention proceeds. The invention is particularly applicable to rubber hydrochloride.

Although photochemical inhibitors are known which will markedly increase the life of rubber hydrohalides exposed to ultra-violet light, most of these possess certain inherent characteristics which, in some instances, are very objectionable. For example, some of them are incompatible with the rubber hydrohalide and tend to "blush" or "bloom" out. Some of them are fugitive so that, although they are effective in freshly prepared rubber hydrohalide, they are eventually lost, and their inhibiting effect with them. The compatibility and relative permanence of these photochemical inhibitors are markedly affected by the use of various plasticizers in the rubber hydrohalide. For example, some inhibitors are entirely satisfactory in unplasticized rubber hydrohalides but tend to "bloom out" in plasticized mixtures, i. e., they come to the surface of the film or other article, forming a crystalline or oily deposit on the surface thereof. Plasticizers are desirable components of rubber hydrohalide mixes for the manufacture of many articles, particularly in the form of film, which are normally exposed to sunlight, e. g., window curtains, wrapping materials, etc., in order to give a softer "feel" to the rubber hydrohalide and increase its tear resistance. The preferred inhibitors of this invention are, therefore, those which are compatible with plasticized films or other structures of rubber hydrohalides and do not form a bloom on such material on standing or ageing. The preferred plasticizers for such use are butyl stearate or other alkyl esters of fatty acids, dibutyl phthalate or other alkyl esters of phthalic acid or a hydrogenated phthalic acid, and ethyl abietate or other ester of an acid derived from a vegetable oil. Suitable plasticizers are propyl stearate, amyl stearate, hexyl stearate, heptyl stearate, decyl stearate, cyclohexyl stearate, glycol stearate, glyceryl stearate, ethyl oleate, butyl oleate, heptyl oleate, butyl palmitate, the propyl, amyl, heptyl, octyl, etc. esters of phthalic and hydrogenated phthalic acids, tributyl phosphate, triphenyl phosphate, and triphenyl thiophosphate. Such plasticizers, which impart tear-resistance to rubber hydrohalides, are described in U. S. application Serial No. 102,223, filed September 23, 1936 in the name of Calvert.

According to the invention, a new class of photochemical inhibitors for rubber hydrohalides has been discovered, the members of which have a number of very desirable characteristics. They effectively resist the deteriorating effect of light and the preferred members of the class are highly compatible with the rubber hydrohalide and are substantially permanent and non-fugitive in plasticized or unplasticized rubber hydrohalides.

It has been known that primary amines will react with ethylene dihalides, such as ethylene dibromide, to produce substituted ethylene diamines and piperazines according to the following equations:

(1) 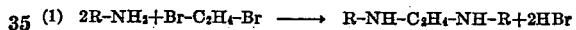

(2) 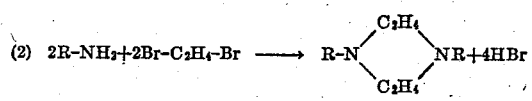

These two reactions proceed simultaneously and both types of products are obtained. These products are not included in the present invention. In addition, a number of more complex reactions also take place and it is found, in carrying out the reaction, that a mixture of the products of these more complex reactions is also obtained. These complex products may conform to a variety of types. Thus, one mol of the amine reacts with one mol of ethylene dibromide according to the following equation:

(3) 

The amino ethylene bromide formed according to Equation 3 reacted with the substituted ethylene diamine resulting from Equation 1 gives a diethylene triamine in the following manner.

(4) 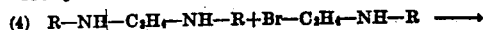
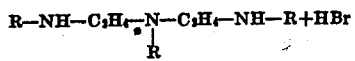

A triethylene tetramine may then be formed by any of the following processes:

(5) 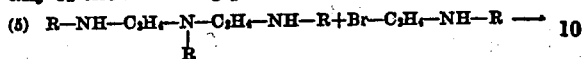
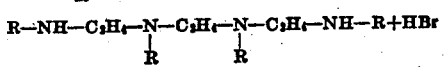

(6) 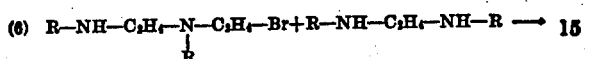
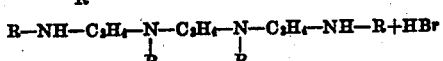

(7) 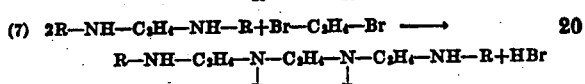
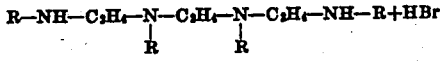

By successive reactions similar to those above, these ethylene polyamines may build up to compounds of very high molecular weight.

Large cyclic compounds may be similarly formed by joinder of the terminal secondary amino groups by reaction with ethylene bromide. It is also possible that other types of reactions take place.

Compounds of the class type indicated above may also be prepared by reacting diethylene triamine, triethylene tetramine, etc. with a suitable alkyl halide as illustrated by the following equations:

(8) 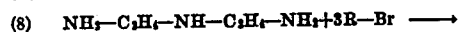
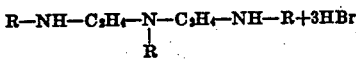

(9) 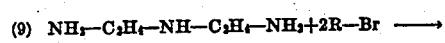

These "high boilers," or high molecular weight compounds in which the R's of the foregoing formulae are predominantly aliphatic, constitute the class of materials which have been found to be effective photochemical inhibitors. The following examples illustrate the preparation of such materials.

EXAMPLE 1

Two hundred eighty-two parts (2.5 mols) of o-methyl cyclohexylamine were placed in a reactor equipped with a stirrer, a reflux condenser and a thermometer and the charge was heated to about 100° C. About 10% of the total charge of 192 parts (1.02 mol) of ethylene dibromide was run in slowly and was allowed to react. A portion (5-10% of the total) of the caustic used to neutralize the hydrobromic acid formed in the reaction was then added. (This caustic solution was made by dissolving 80 parts of sodium hydroxide in 150 parts of water). The ethylene dibromide and caustic were thereafter alternately added in small portions (5-10% of the total), allowing time for reaction after each addition, the reaction mixture being kept at a gentle reflux temperature of about 110° C. After about three hours, the lower aqueous layer containing sodium bromide was separated from the upper oily layer. The latter was distilled at 10-12 mm. pressure to obtain 86 parts of unreacted o-methyl cyclohexylamine, which was recovered below 170° C. A fraction amounting to 214 parts was obtained at 170-270° C. This was redistilled at 10 mm. pressure to give 192 parts of a mixture of N,N'di(o-methyl cyclohexyl) ethylene diamine and N,N'di(o-methyl cyclohexyl) piperazine recovered over a temperature range of 180-215° C. At 215-259° C., 21 parts of a brownish, sirupy liquid were obtained. This was a mixture of "high boilers" useful as photochemical inhibitors in rubber hydrohalides.

EXAMPLE 2

Two hundred two parts (2 mols) of tetrahydro furfurylamine, 188 parts (1 mol) of ethylene dibromide, and a solution of 90 parts of sodium hydroxide dissolved in 180 parts of water were reacted by the method outlined in Example 1. The product was distilled at 10-12 mm. pressure to yield the following fractions:

| | Parts |
|---|---|
| (1) Up to 160° C | 90 |
| (2) 160-220° C | 74 |
| (3) 220-270° C | 53 |

As before, fraction 2 contained the ethylene diamine and piperazine derivatives. Fraction 3 contained high molecular compounds having the desired inhibiting properties.

EXAMPLE 3

One hundred thirteen parts (1 mol) of 3-methyl cyclohexylamine, 188 parts (1 mol) of ethylene dibromide and a solution of 90 parts of sodium hydroxide dissolved in 170 parts of water were reacted as follows:

The amine was heated to 140°, ethylene dibromide was added in small portions, the temperature slowly rising to 175° C. When about half of the total ethylene dibromide had been added, crystals of the amine hydrobromide began to form. The mixture was then cooled to 120° C. and one-third of the caustic was added. The remainder of the ethylene didromide was then slowly added and the mixture was refluxed for about one hour, after which the remainder of the caustic was added and the refluxing was continued for another hour. The oily reaction product was separated from the aqueous sodium bromide layer and was distilled at 10 mm. pressure. About 66 parts of the desired high-boiling constituents were obtained at 200-300° C., and 10 parts of still higher boiling material were obtained as residue boiling above 300° C. Both of these fractions were effective photochemical inhibitors.

EXAMPLE 4

Four hundred fifty-two grams (4 mols) of o-methyl cyclohexylamine were reacted with 564 grams (3 mols) of ethylene dibromide as follows:

The amine was placed in a flask equipped with a stirrer, a reflux condenser, and a dropping funnel and heated to about 125° C. Ethylene bromide was then slowly added through the dropping funnel. To prevent crystallization of amine hydrobromide formed during the reaction, a few cc. of water were added through the condenser from time to time. When about half the ethylene dibromide had been added, the mixture was heated to 120-130° C. for 10 minutes and about 90 grams of sodium hydroxide dissolved in 167 cc. of water were slowly added. The remainder of the ethylene dibromide was added as before and, after heating 10-15 minutes at 115-120° C., about 180 grams of sodium hydroxide dissolved in 334 cc. of water were slowly added. The mixture was then maintained at 115-120° C. for one hour. The oily layer was separated from the aqueous layer and distilled at 6-7 mm. pressure. Eighty grams of material were obtained below 160° C., 257 grams, consisting largely of N,N'di(o-methyl cyclohexyl) ethylene diamine, came over at 160-205° C., and the residue weighed 205 grams. The residue was a brown oil, which became viscous on cooling and consisted of a mixture of "high boilers" useful as photochemical inhibitors. Distillation of the residue at 3-5 mm. pressure gave a major fraction boiling at 235-240° C., which was also effective as a photochemical inhibitor.

EXAMPLE 5

The N,N'di(o-methyl cyclohexyl) ethylene diamine obtained in Example 4 in the 257 gram fraction boiling at 160-205° C. at 6-7 mm. pressure can be utilized in preparing succeeding batches of "high boilers," as illustrated in the following procedure. Three hundred seventy-five grams (1.5 mols) of N,N'di(o-methyl cyclohexyl) ethylene diamine, 339 grams (3 mols) of o-methyl cyclohexylamine, and 564 grams (3 mols) of ethylene dibromide were reacted, using a solution of 270 grams of sodium hydroxide dissolved in 500 cc. of water to absorb the hydrobromic acid formed. The mixed amines were heated to about 120° C. and one-half of the ethylene dibromide was slowly added, also adding a few cc. of water from time to time to prevent crystallization. The mixture was heated at 125-130° C. for 10-15 minutes and about ⅓ of the caustic solution was slowly added. The remainder of the ethylene dibromide was then slowly added followed by the remainder of the caustic solution. The mixture was heated, with stirring, for one hour at 115-120° C. The oily layer was washed with water and distilled at 5-6 mm. pressure to obtain the following fractions:

|  | Grams |
|---|---|
| Below 160° C | 24 |
| 160-205° C | 378 |
| Residue | 262 |

The residue consisted of a mixture of the desired high-boiling photochemical inhibitors.

EXAMPLE 6

A mixture of 200 grams of N,N'di(o-methyl cyclohexyl) ethylene diamine, 135 grams of o-methyl cyclohexylamine, 99 grams of ethylene dichloride, and 200 cc. of water was placed in a steel autoclave and heated at 200° for one-half hour. The reaction mixture was cooled to about 100° C., at which temperature it was completely liquid, and was treated with a mixture of 90 grams of sodium hydroxide and 100 cc. of water and boiled for one-half hour. The oily portion was then separated, washed with water and distilled at 5 mm. pressure to give the following fractions:

|  | Grams |
|---|---|
| Below 160° C. | 56 |
| 160-210° C | 221 |
| Residue | 65 |

The residue was a brown, viscous oil possessing the desired photo-chemical inhibiting properties.

EXAMPLE 7

Eight hundred grams (8.1 mols) of cyclohexylamine, mixed with 100 cc. of water, were treated with 564 grams (3 mols) of ethylene dibromide at a temperature rising from 100° C. to 120° C. Then about ⅓ of a solution of 540 grams of sodium hydroxide dissolved in 1000 cc. of water was added, followed after heating and stirring for 10-15 minutes by a second portion of 564 grams (3 mols) of ethylene dibromide and finally the remainder of the caustic solution. The mixture was stirred and heated at 115-120° C. for one hour. The oily product was separated, washed with water, and distilled at 5 mm. pressure to yield the following fractions:

|  | Grams |
|---|---|
| Below 150° C | 127 |
| 150-217° C | 683.5 |
| Residue | 152 |

The residue was a brown, viscous mixture of the desired photo-chemical inhibitors.

EXAMPLE 8

Seventy-six parts of diethylene triamine, 310 parts of butyl bromide and a solution of 90 parts of sodium hydroxide dissolved in 200 parts of water were reacted by the method of Example 1. The reaction product was distilled at 4-5 mm. pressure, one hundred fifteen parts of the desired butyl diethylene triamines being obtained at 160-200° C.

The foregoing examples are illustrative of the materials useful in the invention and of methods of preparing them. Other alkylene polyhalides may be used in place of the ethylene dibromide and ethylene dichloride of Examples 1-7 and other primary aliphatic amines may be employed instead of the amines there used.

Representative examples of other alkylene polyhalides which may be used are n-propylene dibromide, 1,2-dibromopropane, 1-2, 1-3 and 1-4 dichlor or dibrom butane, the di- or tri-halogen derivatives of the pentanes, dichlorhydrin, di-(chlorethyl) ether, and homologues of these compounds. Of these materials, those compounds in which the alkylene groups are hydrocarbon groups are preferred.

Any primary aliphatic amine may be employed, including straight or branched chain amines, cycloaliphatic amines, such as cyclohexyamine, and ring substituted aliphatic amines, such as benzyl amine and furfurylamine. Further examples of suitable amines are the butylamines, the amylamines, tetrahydrofurfurylamine, o-, m- and p-methyl cyclohexylamine, the hexahydro xylidenes, o-cyclohexyl cyclohexylamine, 2,4 dimethyl cyclohexyl amine, 3,3,5-trimethyl cyclohexylamine, the heptylamines, the nonylamines, the hexahydrophenetidines, the decahydronaphthylamines, the ac-tetrahydro naphthylamines, allylamine, β-cyclohexyl ethylamine, the aliphatic amino alcohols, β-phenyl ethylamine, etc., which may also contain various neutral or basic substituents such as amino, hydroxyl, alkoxy, aryloxy, etc. radicals. Those amines in which the aliphatic group is hydrocarbon are preferred.

When materials coming within the invention are prepared by the method represented by Equations 8 and 9 and Example 8, various polyalkylene polyamines such as diethylene triamine, triethylene tetramine, tetraethylene pentamine, dipropylene triamine, dibutylene triamine, etc. may be reacted with any aliphatic halide such as the butyl bromides, the amyl bromides, benzyl bromide, cyclohexyl chloride and other aliphatic halides corresponding to the aliphatic amines listed in the preceding paragraph. Those compounds in which the alkylene or aliphatic groups are hydrocarbon are preferred.

In view of the varied courses which the reaction may take, substantially any proportions of reactants may be employed. Also, the temperature, pressure and other conditions of the reaction may be varied greatly while still obtaining materials coming within the invention.

The "high boilers" as obtained in the illustrative examples may be divided into fractions or separated into components and utilized as such but may also be used without any such separation into parts. The complex mixture is suitable for direct use and is a very effective photochemical inhibitor and constitutes a preferred form of the invention.

Representative examples of the materials of the invention were incorporated into rubber hydrochloride and samples in the form of thin films were exposed to artificial sunlight in a Fadeometer and to natural sunlight to determine the relative life of the protected film as compared with the life of a control containing no photochemical inhibitor but otherwise identical. A number of the materials tested and the results obtained are listed in the following tables. Three formulations were employed; number 1 contained no plasticizer; number 2 contained 7½% dibutyl phthalate and 2½% butyl stearate (based on the weight of rubber hydrochloride); number 3 contained 10% dibutyl phthalate. These same numbers are used in Table II below to indicate the formulations used with particular photochemical inhibitors in the tests. The inhibitors used in the tests are listed in Table I.

Table I

| Inhibitor | Reaction product of— |
|---|---|
| A | N,N' di(o-methyl cyclohexyl) ethylene diamine+ethylene dibromide (B. P. 205-250° C. at 8 mm.) |
| B | o-Methyl cyclohexylamine+ethylene dibromide (B. P. 250-260° C. at 12 mm.) |
| C | Tetrahydrofurfurylamine+ethylene dibromide (B. P. 220-270° C. at 10-12 mm.) |
| D | x,y Hexahydro, xylidene+ethylene dibromide (B. P. 200-300° C. at 5 mm.) |
| E | 3-methyl cyclohexylamine+ethylene dibromide (B. P. 200-300° C. at 10 mm.) |
| F | 3-methyl cyclohexylamine+ethylene dibromide (B. P. above 300° C. at 10 mm.) |
| G | 2,4-dimethyl cyclohexylamine+ethylene dibromide (B. P. 200-300° C. at 5 mm.) |
| H | 2,4-dimethyl cyclohexylamine+ethylene dibromide (B. P. above 300° C. at 5 mm.) |
| I | o-Methyl cyclohexylamine+ethylene dibromide (B. P. 230-240° C. at 4-5 mm.) |

Table II

| Inhibitor and formulation | Percent of inhibitor | Life as percent of control | |
|---|---|---|---|
| | | Fadeometer | Florida sunshine |
| A-1 | 7½ | >200 | 332 |
| A-2 | 7½ | 377 | 270 |
| A-3 | 7½ | 218 | 257 |
| B-1 | 7½ | 728 | >280 |
| B-2 | 5 | 270 | |
| B-2 | 7½ | 325 | 283 |
| B-2 | 10 | 445 | |
| B-3 | 7½ | 488 | 342 |
| C-1 | 7½ | 210 | 317 |
| C-2 | 7½ | 203 | 283 |
| C-3 | 7½ | 193 | 283 |
| D-3 | 7½ | 192 | 300 |
| E-3 | 7½ | 492 | 395 |
| F-3 | 7½ | 412 | 454 |
| G-3 | 7½ | 357 | 300 |
| H-3 | 7½ | 357 | 275 |
| I-3 | 7½ | 357 | 275 |

It will be seen from these data that the materials of the invention are very effective photochemical inhibitors for rubber hydrohalides such as rubber hydrochloride. Moreover, as a class, these materials are relatively more permanent than previously known inhibitors, this improvement being particularly noticeable in film containing added plasticizers such as butyl stearate and dibutyl phthalate.

What I claim is:

1. Rubber hydrochloride containing a photochemical inhibitor which is a reaction product of an alkylene polyhalide and a primary aliphatic amine, the said product having a boiling point higher than any alkylene polyamine and any N-aliphatic piperazine formed from the same starting materials.

2. Rubber hydrochloride containing a photochemical inhibitor which is a reaction product of an ethylene dihalide and a primary aliphatic amine, the said product having a boiling point higher than that of the N,N'di(aliphatic) piperazine formed from the same starting materials.

3. Rubber hydrochloride containing, as a photochemical inhibitor, the composite product obtained by reacting an alkylene polyhalide with a primary aliphatic amine and freeing the reaction product from any contained alkylene polyamines, piperazines and unreacted starting materials.

4. Rubber hydrochloride containing as a photochemical inhibitor, the composite product obtained by reacting an ethylene dihalide with a primary aliphatic amine and freeing the resultant reaction product from unreacted starting materials and by-product di(aliphatic) ethylene diamine and N,N'di(aliphatic) piperazine.

5. Rubber hydrochloride containing a photochemical inhibitor which is a reaction product of an alkylene dihalide and a primary aliphatic amine, the said product containing more than two aliphatic substituted nitrogen atoms and having nitrogen to nitrogen linkages effected through alkylene groups.

6. Rubber hydrochloride containing, as a photochemical inhibitor, a polyalkylene polyamine in which each of the amino nitrogen atoms contains one aliphatic substituent in addition to the connecting alkylene groups.

7. A film comprising rubber hydrochloride and a plasticizer which increases the tear-resistance of the film and a photochemical inhibitor which is a reaction product of an alkylene dihalide and a primary aliphatic amine, the said product containing more than two aliphatic substituted nitrogen atoms and having nitrogen to nitrogen linkages effected through alkylene groups and being sufficiently compatible with the plasticized rubber hydrochloride so that it forms no appreciable "bloom" on standing.

8. Rubber hydrochloride containing, as a photochemical inhibitor, the composite product obtained by reacting a poly alkylene polyamine with an aliphatic halide and freeing the resultant reaction product from unreacted starting materials.

9. Rubber hydrochloride containing a photochemical inhibitor having the structural formula

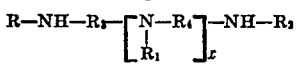

in which R and $R_2$ are aliphatic radicals, $R_1$ is selected from the group consisting of hydrogen and aliphatic radicals, $R_3$ and $R_4$ are alkylene groups and $x$ is a whole number.

WINFIELD SCOTT.